United States Patent [19]
Watanabe

[11] Patent Number: 5,732,196
[45] Date of Patent: Mar. 24, 1998

[54] DATA PROCESSING METHOD AND APPARATUS

[75] Inventor: Naoya Watanabe, Yokohama, Japan

[73] Assignee: Canon Kabushiki Kaisha, Tokyo, Japan

[21] Appl. No.: 335,371

[22] Filed: Nov. 3, 1994

[30] Foreign Application Priority Data

Nov. 25, 1993 [JP] Japan ............... 5-295368

[51] Int. Cl.⁶ .................................................. G06K 15/00
[52] U.S. Cl. ............................................. 395/102; 395/114
[58] Field of Search ........................................ 395/102, 114, 395/112, 117, 200.01, 200.02, 200.03, 200.06, 200.18, 128, 892, 885–886; 358/444, 261.2, 261.3, 428, 430, 431, 432, 433

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,608,577 | 8/1986 | Hori | 346/140 |
| 4,723,129 | 2/1988 | Endo et al. | 346/1.1 |
| 4,740,796 | 4/1988 | Endo et al. | 346/1.1 |
| 4,791,491 | 12/1988 | Minowa | 358/284 |
| 4,814,890 | 3/1989 | Kato | 358/443 |
| 4,841,375 | 6/1989 | Nakajima et al. | 353/280 |

FOREIGN PATENT DOCUMENTS

| | | |
|---|---|---|
| 0489338A2 | 10/1992 | European Pat. Off. . |
| 5458647 | 10/1977 | Japan . |
| 59-138461 | 1/1983 | Japan . |
| 60-71260 | 4/1985 | Japan . |

OTHER PUBLICATIONS

Patent Abstracts of Japan, vol. 16, No. 64 (E–1167) 18 Feb. 1992 & JP–A–03 259 657 (Canon) Nov. 19, 1991.

*Primary Examiner*—Arthur G. Evans
*Attorney, Agent, or Firm*—Fitzpatrick, Cella, Harper & Scinto

[57] ABSTRACT

In a facsimile apparatus including a recording unit having a resolution higher than the resolution of an image received through facsimile communication, a facsimile control unit performs resolution conversion in the main scanning direction for the received data, adds a predetermined command to line data of the data, and transmits the resultant data to the recording unit. This command indicates the number of operations of copying the line data in order to perform resolution conversion in the sub-scanning direction. The recording unit copies the line data some number of times in accordance with the command, and develops the obtained data in a printing buffer. A recording head is driven in accordance with the data stored in the printing buffer, to record the image. It is thereby possible to shorten the time needed for data transfer from the facsimile control unit to the recording unit.

21 Claims, 9 Drawing Sheets

DATA PROCESSING METHOD AND APPARATUS

BACKGROUND OF THE INVENTION

1. Field of the Invention

This invention relates to a data processing method and apparatus in which processing of converting resolution is performed for image data.

2. Description of the Related Art

Recently, facsimile apparatuses, in which a recording system having a resolution different from that of an image received through facsimile communication is used, have been practically used. In some such apparatuses, a printer interface is provided, and a recording unit can be used as a printer for an external information processing apparatus, such as a computer or the like. However, when using the recording unit as an output apparatus for an image received through facsimile communication or obtained by a copying operation, resolution conversion must be performed when the reading resolution of an image received through facsimile communication or a copied image differs from the resolution of the recording unit. In conventional resolution conversion in the sub-scanning direction, a main control unit of a facsimile apparatus (hereinafter termed a "facsimile control unit") adjusts resolution by repeatedly transmitting image data for one line to the recording unit a plurality of times.

Figure 9:
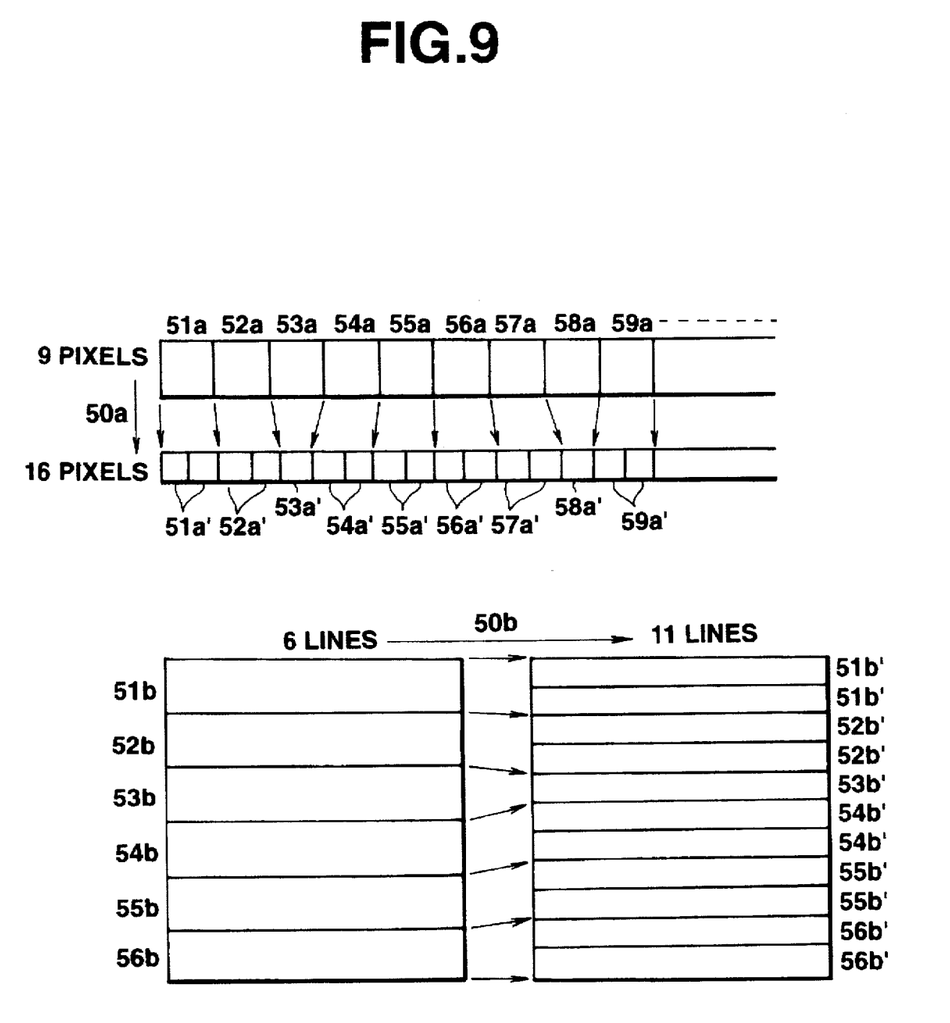
FIG. 9 is a diagram illustrating resolution conversion.

FIG. 9 is a diagram illustrating resolution conversion in the main scanning direction and the sub-scanning direction in a facsimile apparatus.

First, the ratio of the resolution of a read or received image to the resolution in a recording operation is as follows:

Main scanning direction: 8 pels (picture elements)÷360 dpi (dots per inch)=0.564

Sub-scanning direction: 7.7 lines/mm÷360 dpi=0.543.

In a facsimile apparatus in which reading resolution differs from recording resolution, or a recording density differs from resolution in facsimile communication, a resolution conversion circuit is required because an image must be recorded with the same magnification as that of an original during a reception or copying operation. If original data is developed from 9 bits into 16 bits in the main scanning direction, and from 6 bits into 11 bits in the sub-scanning direction, the magnification is as follows:

Main scanning direction: 0.564×(16/9)=1.003

Sub-scanning direction: 0.543×(11/6)=0.996, so that an image can be recorded with substantially the same magnification as that of the original image.

FIG. 9 briefly illustrates the concept of resolution conversion when a read image is copied or a received image is recorded. In FIG. 9, reference numeral 50a represents resolution conversion in the main scanning direction. By replacing a read or received pixel (picture element) 51a by two recorded pixels 51a', and a pixel 53a by a single recorded pixel 53a', unit-magnification recording in the main scanning direction can be performed.

Reference numeral 50b represents resolution conversion in the sub-scanning direction. By replacing read or received pixels for one line 51b by recorded pixels for two lines 51b', and pixels 53b by recorded pixels for one line 53b', unit-magnification recording in the sub-scanning direction can be performed.

For the above-described resolution conversion in the sub-scanning direction, the main control unit transmits image data for the same line to the recording unit a plurality of (two) times with a predetermined ratio.

However, since the amount of image data is great, the entire amount of data transmitted to the recording unit further increases if image data for one line is transmitted a plurality of times. An increase in the amount of transmitted data causes an increase in the data transmission time, thereby causing an increase in the time required for outputting a received or copied image.

SUMMARY OF THE INVENTION

The present invention has been made in consideration of the above-described problems.

It is an object of the present invention to provide an improved data processing method and apparatus.

It is another object of the present invention to provide a data processing method and apparatus in which the time required for data transmission can be reduced.

It is still another object of the present invention to provide a data processing method and apparatus, in which when data transmission means transmits image data while adding information for resolution conversion to the data, data processing means performs resolution conversion based on the information.

According to one aspect, the present invention, which achieves these objectives, relates to a data processing apparatus comprising data transmission means for transmitting image data having a first resolution while adding information for converting the first resolution into a second resolution, which is higher than the first resolution, to the image data, and data processing means for converting the resolution of the image data into the second resolution by receiving the image data and the information transmitted from the data transmission means and performing copying processing of the image data based on the information, and for performing predetermined processing in accordance with converted data.

According to another aspect, the present invention relates to a data processing apparatus comprising data transmission means for transmitting image data having a first resolution while adding information for converting the first resolution into a second resolution, which is higher than the first resolution, to the image data, data processing means for converting the resolution of the image data into the second resolution by receiving the image data and the information transmitted from the data transmission means and performing copying processing of the image data based on the information, and recording means for performing recording on a recording material with the second resolution based on the image data subjected to the resolution conversion by the data processing means.

According to still another aspect, the present invention relates to a data processing method comprising the steps of obtaining image data having a first resolution, transmitting the obtained image data while adding information for converting the first resolution into a second resolution, which is higher than the first resolution, to the image data, receiving the transmitted information the image data, converting the resolution of the image data into the second resolution by performing copying processing of the image data based on the received information, and performing predetermined processing in accordance with the image data subjected to the resolution conversion.

According to yet another aspect, the present invention relates to a data processing method comprising the steps of obtaining image data having a first resolution, transmitting the obtained image data while adding information for converting the first resolution into a second resolution, which is higher than the first resolution, to the image data, receiving the transmitted information the image data, converting the resolution of the image data into the second resolution by performing copying processing of the image data based on the received information, and recording an image on a recording material in accordance with the image data subjected to the resolution conversion.

The foregoing and other objects, advantages and features of the present invention will become more fully apparent from the following detailed description of the preferred embodiments taken in conjunction with the accompanying drawings.

DETAILED DESCRIPTION OF THE PREFERRED EMBODIMENTS

Figure 1:
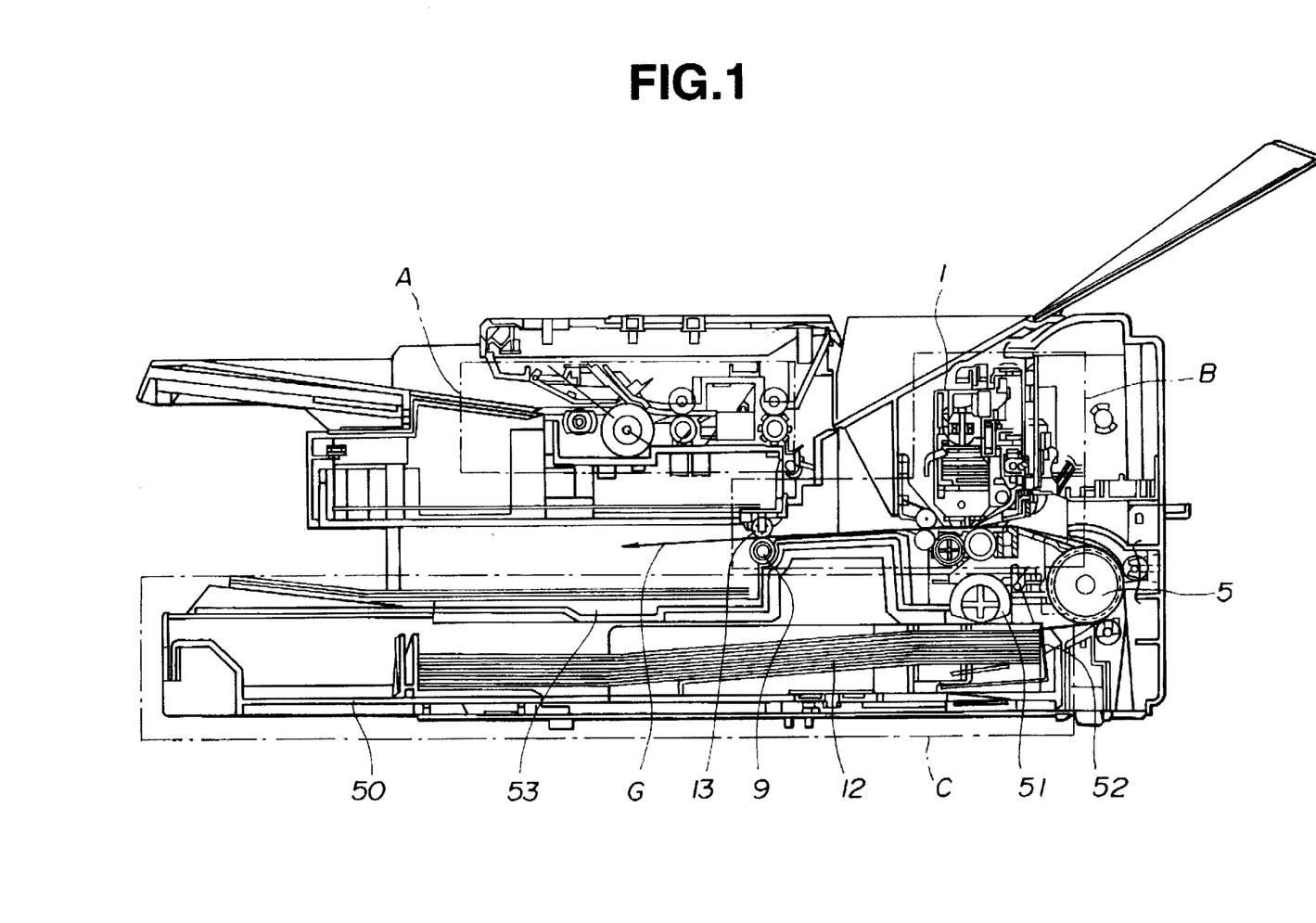
FIG. 1 is a cross-sectional view illustrating a facsimile apparatus according to an embodiment of the present invention.

A preferred embodiment of the present invention will now be described in detail with reference to the drawings. FIG. 1 is a cross-sectional view illustrating a facsimile apparatus of the embodiment. In FIG. 1, a reading unit A optically reads an original. A recording unit B comprises an ink-jet recorder. A sheet-feeding unit C supplies the recording unit B with sheets of recording paper, comprising cut sheets, mounted on a recording-paper cassette while individually separating sheets of the recording paper.

First, the flow of a sheet of the recording paper will be briefly described with reference to FIG. 1. A conveying path for the sheet is indicated by symbol G. First, the uppermost sheet of recording paper 12 mounted in a recording-paper cassette 50 is picked up by a sheet-feeding roller 51 and separation pawls 52, and is conveyed to the recording unit by a conveying roller 5. In the recording unit, recording is performed by performing main scanning by reciprocating a recording head 1 in directions perpendicular to the plane of FIG. 1 by a carriage. After the sheet has been conveyed a certain distance within the apparatus, the sheet is discharged by a sheet-discharging roller 9, and is mounted on a discharged-sheet stacker 53. A photosensor 13 is disposed on the shaft of the sheet-discharging roller 9. The photosensor 13 detects exhaustion of ink in the recording head 1, as well as sheet jams in the vicinity of the sheet-discharging roller 9, by detecting the density of a footer pattern printed on a trailing-end portion of the sheet.

Figure 2:
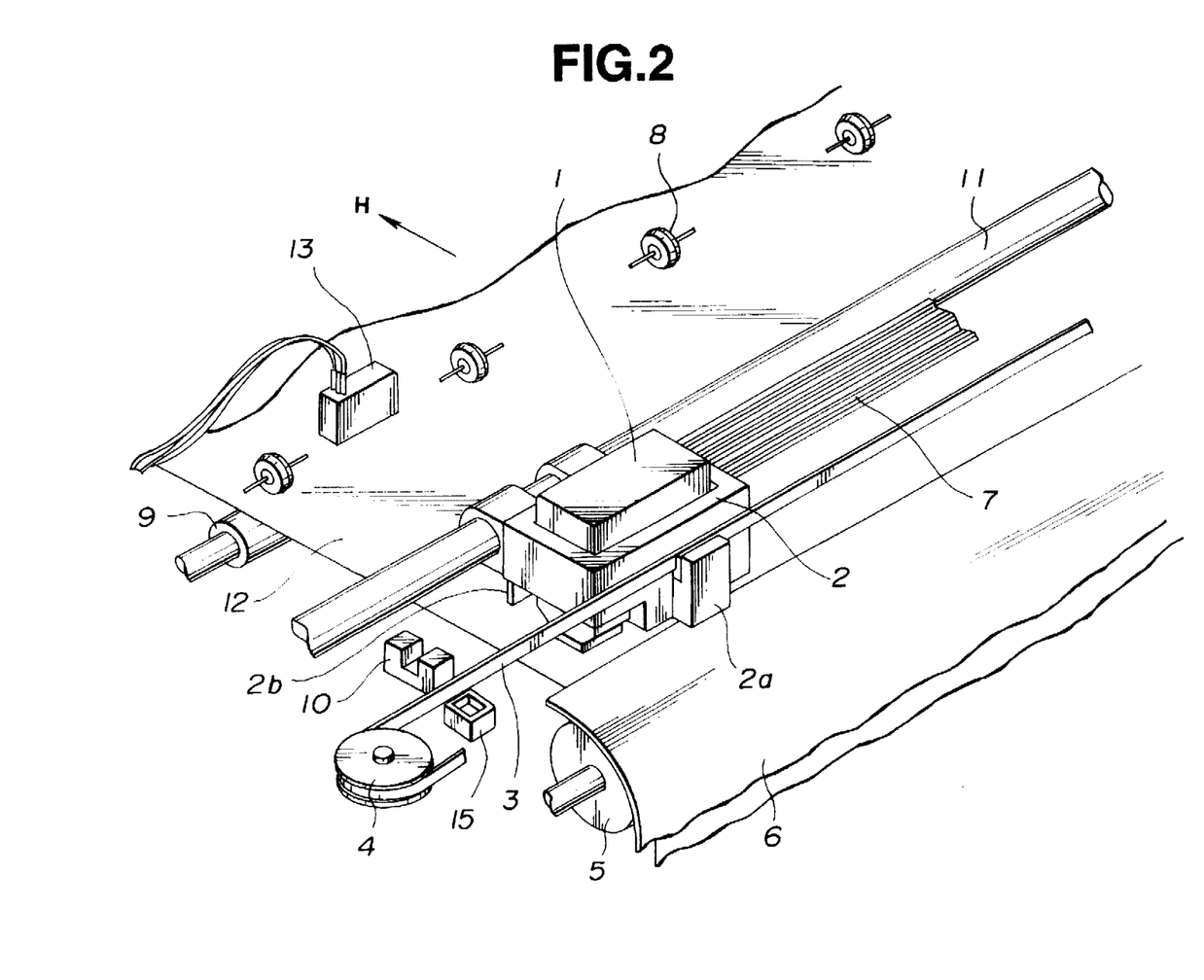
FIG. 2 is a perspective view illustrating part of the configuration of the facsimile apparatus shown in FIG. 1.

Next, the configuration of the recording unit of the present embodiment will be described in detail with reference to FIG. 2. In FIG. 2, the recording head 1 is shown. In the present embodiment, a cartridge-type ink-jet recording head, which incorporates an ink tank and which can be replaced by a new head when ink is exhausted, is used as the recording head 1.

The recording head 1 has a resolution of 360 dpi, and includes 64 nozzles. The ink is discharged from a discharging port provided at the distal end of each nozzle due to the pressure of film boiling produced in the ink by being heated by an electrothermal transducer provided within the nozzle.

A carriage 2 reciprocates the recording head 1 in directions orthogonal to the conveying direction of the recording paper 12 (the sub-scanning direction), i.e., the main scanning direction. The carriage 2 is slidably held by a guide bar 11 and a contact unit 2a. The carriage 2 is reciprocated by a pulley 4 driven by a carriage motor (not shown), and a timing belt 3. At that time, a printing signal and electric power are supplied from an electric circuit of the main body of the apparatus to the recording head 1 via a flexible cable 7.

Reference numeral 15 represents a cap which operates as ink-receiving means. The cap 15 is provided at a position corresponding to a position where the carriage 2 assumes a standby state (a home position), and moves vertically whenever necessary. When the cap 15 is raised, it is in close contact with the recording head 1, so as to cover the nozzle portion and thereby to prevent evaporation of ink and adhesion of dust.

In the present embodiment, in order to position the recording head 1 and the cap 1 so as to face each other, a carriage home sensor 10 provided in the main body of the apparatus, and a light-blocking plate 2b provided on the carriage 2 are used. The carriage home sensor 10 comprises a transmission photo-interrupter, which detects that the recording head 1 and the cap 15 face each other by utilizing the fact that when the carriage 2 has moved to the standby position, light emitted from a portion of the carriage home sensor 10 is interrupted by the light-blocking plate 2b.

The sheet of the recording paper 12 is fed upward from below in FIG. 2, is then bent in the horizontal direction by the conveying roller 5 and a sheet guide 6, and is conveyed in a direction indicated by arrow H (the sub-scanning direction). The conveying roller 5 and the sheet-discharging roller 9 are driven by respective driving systems (not shown), to convey the sheet of the recording paper 12 in the sub-scanning direction with high accuracy linked with the reciprocating movement of the carriage 2 whenever necessary. Each of spurs 8 is made of a material having a high water-repellent property, and contacts the sheet of the recording paper 12 only at its edge-shaped circumferential portion. The spurs 8 are disposed separated from each other by a predetermined length by bearing members (not shown), and are configured so as to guide and convey the sheet of the recording paper 12 without influencing an image on the sheet even if the spurs 8 contact unfixed ink on the sheet immediately after the image has been printed. A photosensor 13 comprises a reflection-type photo-interrupter, which is disposed on the shaft of the sheet-discharging roller 9 and optically detects the presence of a predetermined pattern (a black mark) printed on the sheet. The photosensor 13 can determine exhaustion of ink in the recording head 1 and a sheet jam based on the output of the black mark and an output representing a white portion of the sheet of the recording paper. The photosensor 13 used in the present embodiment comprises a red LED (light-emitting diode), serving as a light-emitting device, and a phototransistor, serving as a photosensing device, and can determine whether a range within a circle having a diameter of 3 mm is white or black. In order to provide an output representing a black portion when the sheet of the recording paper is absent, a portion of the sheet-discharging roller 9 facing the photosensor is made of black rubber.

Figure 3:
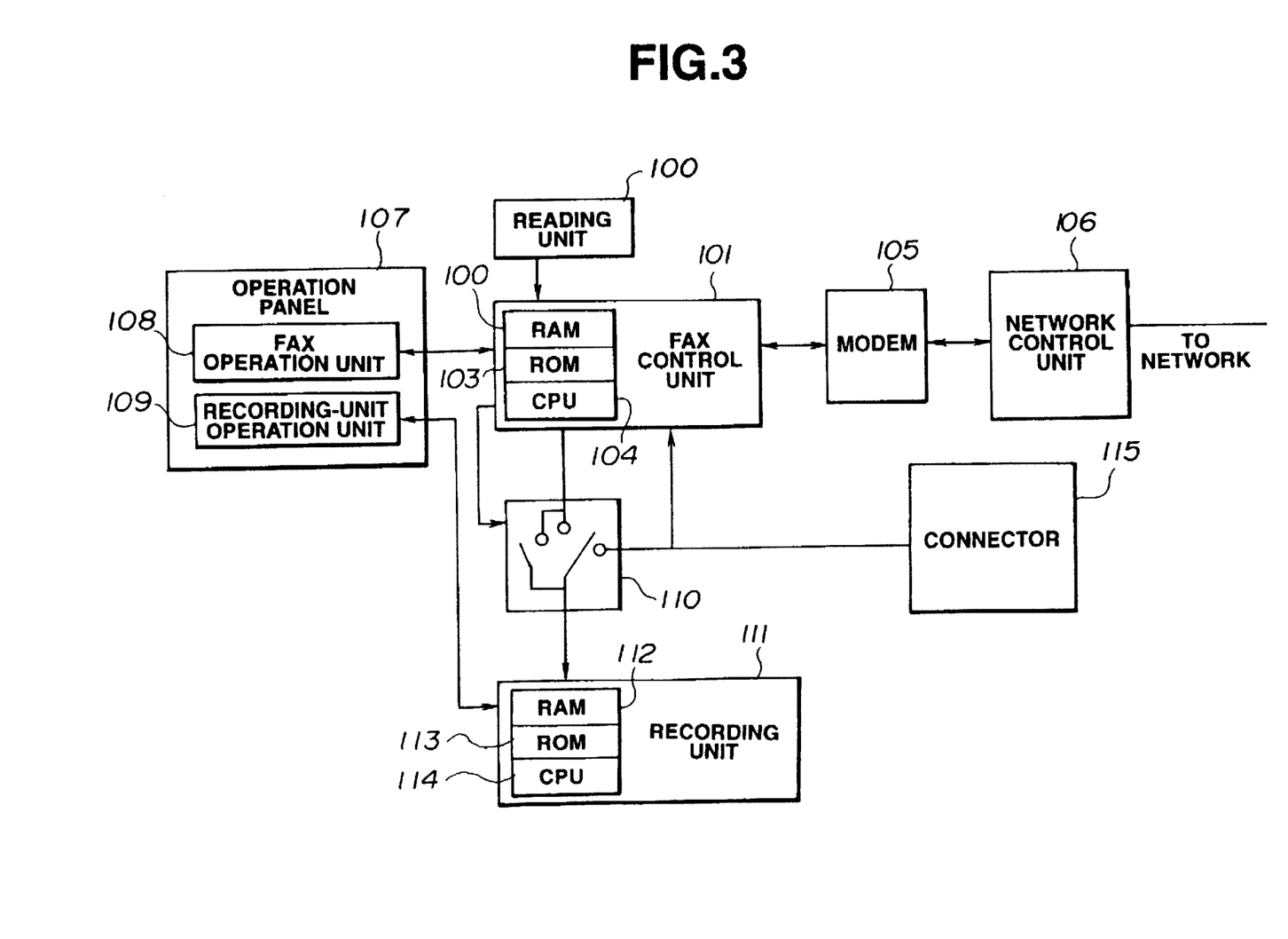
FIG. 3 is a block diagram illustrating the electrical configuration of the facsimile apparatus shown in FIG. 1.

FIG. 3 is a block diagram illustrating the electric configuration of the facsimile apparatus shown in FIGS. 1 and 2. In FIG. 3, reference numeral 101 represents a facsimile control unit comprising a microprocessor and the like. The facsimile control unit 101 comprises a CPU (central processing unit) 104, a ROM (read-only memory) 103, a RAM (random access memory) 102, and the like, and controls image input/output operations and the entire communication processing. The ROM 103 stores control programs. The RAM 102 is used, for example, as a work area for the CPU 104, and as a buffer for image data (an image buffer).

The image input and output operations are performed by a reading unit 100 and a recording unit 111. That is, image data is read by the reading unit 100, which comprises a CCD (charge-coupled device) sensor, an original-conveying system, and the like. Received image data, or image data read by the reading unit 100 during a copying operation is printed on paper by the recording unit 111, which comprises the above-described ink-jet printer.

Connection and data input/output operations with a communication network, such as a telephone line or the like, are performed by a modem 105 and an NCU (network control unit) 106. A telephone set for communication and manual control, and the like are connected to the NCU 106.

As described above, the recording unit 111 comprises an ink-jet head, a carriage, recording-paper conveying means, control means and the like. The control means includes a CPU 114, a ROM 113 for storing control programs for the CPU 114 and character patterns, and a RAM 112 used as a work area for the CPU 114, a reception buffer and a printing buffer.

A switch 110 is switched between a facsimile mode and a printer mode by the control of the facsimile control unit 101. If the switch 110 is switched to side "a", the facsimile mode is provided, and data received through facsimile communication is transmitted to the recording unit, where the data is printed. If the switch 110 is switched to side "b", a printer mode is provided, and printing data from an external information processing apparatus connected to a connector 115 is transmitted to the recording unit, where the data is printed. When the switch is switched to side "b", a terminal c is also connected. A command from the connector 115 is thereby input to the facsimile control unit 101 through the switch 110, so that the facsimile control unit 101 can detect the transmission of the command from the connector 115 to the recording unit when the switch 110 is switched to side 'b'.

A FAX operation unit 108 and a recording-unit operation unit 109 are provided on an operation panel 107. Ten keys for inputting telephone numbers, various kinds of function keys, an operation-mode key for switching the operation mode between the facsimile mode and the printer mode, a display device used for displaying, for example, a telephone number or time, and the like are provided on the FAX operation unit 108. The recording-unit operation unit 109 includes a display unit for displaying the current operation mode.

Next, a description will be provided of the operations of the facsimile control unit and the recording unit.

The recording unit has two operation modes, i.e., a mode of recording an image received through facsimile communication or a copied image (hereinafter termed a "facsimile mode"), and a mode of recording data from the external information processing apparatus (hereinafter termed a "printer mode"). Selection between the facsimile mode and the printer mode is performed through the operation-mode key within the FAX operation unit 108. The recording unit 111 must identify whether received data comprises image data received through facsimile communication or data from the external information processing apparatus. That is, in the facsimile mode, the recording unit 111 must perform resolution conversion in the sub-scanning direction. Accordingly, the facsimile control unit 101 transmits a particular command to the recording unit 111 in accordance with an input from the operation-mode key within the FAX operation unit 108, to set the recording unit 111 to the facsimile mode.

Figure 4:
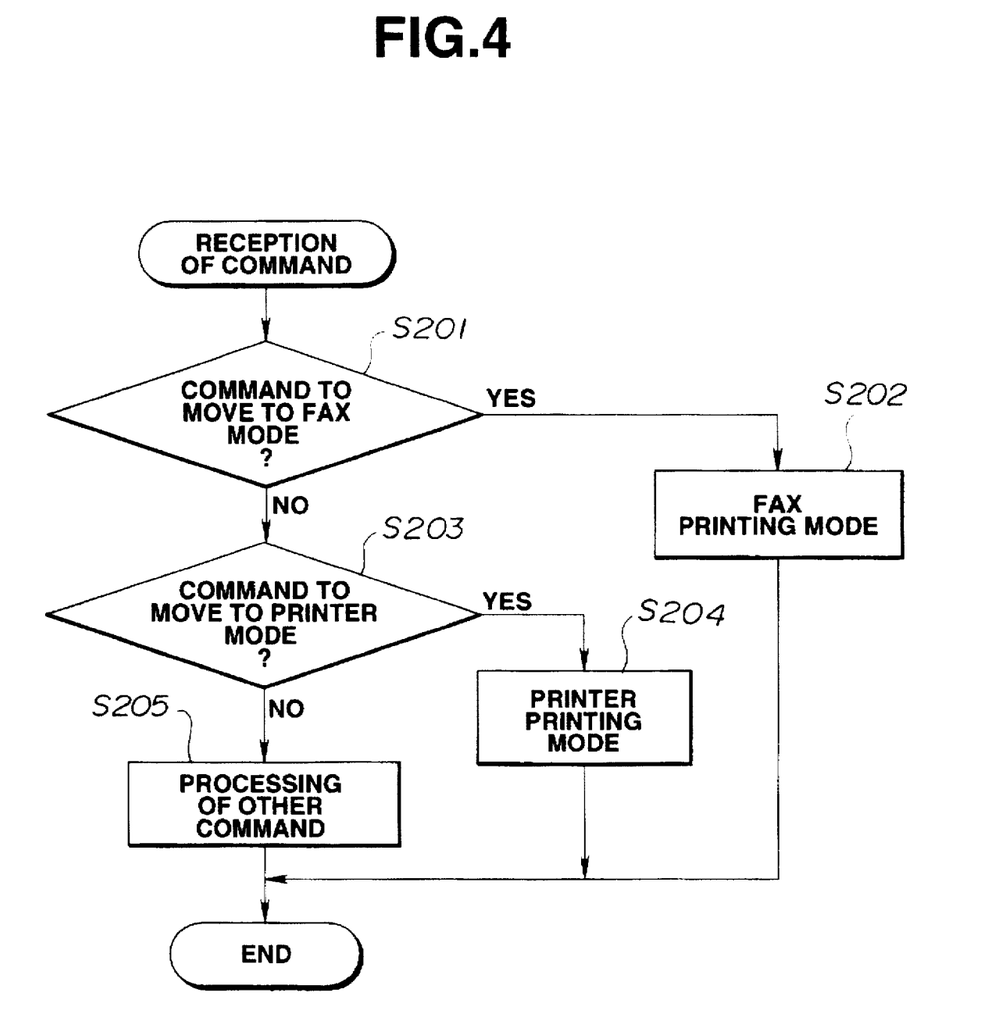
FIG. 4 is a flowchart illustrating the flow of the operation of a recording unit.

FIG. 4 is a flowchart illustrating the operation of the recording unit 111. A program corresponding to this flowchart is stored in the ROM 113, and the CPU 114 performs control in accordance with this program.

When a command has been transmitted from the facsimile control unit 101, the control of the recording unit proceeds to step S201. In step S201, it is determined if the transmitted command is a command to move to the facsimile mode. If the result of the determination is affirmative, the process proceeds to step S202. In step S202, the operation mode of the recording unit is set to a facsimile printing mode, and the operation of receiving the command is terminated. If the result of the determination in step S201 is negative, the process proceeds to step S203. In step S203, it is determined if the received command is a command to move to the printer mode. If the result of the determination is affirmative, the process proceeds to step S204, where a printer printing mode is set, and the process is terminated. If the result of the determination in step S203 is negative, the process proceeds to step S205, where the received command is processed, and the process is terminated.

Figure 5:
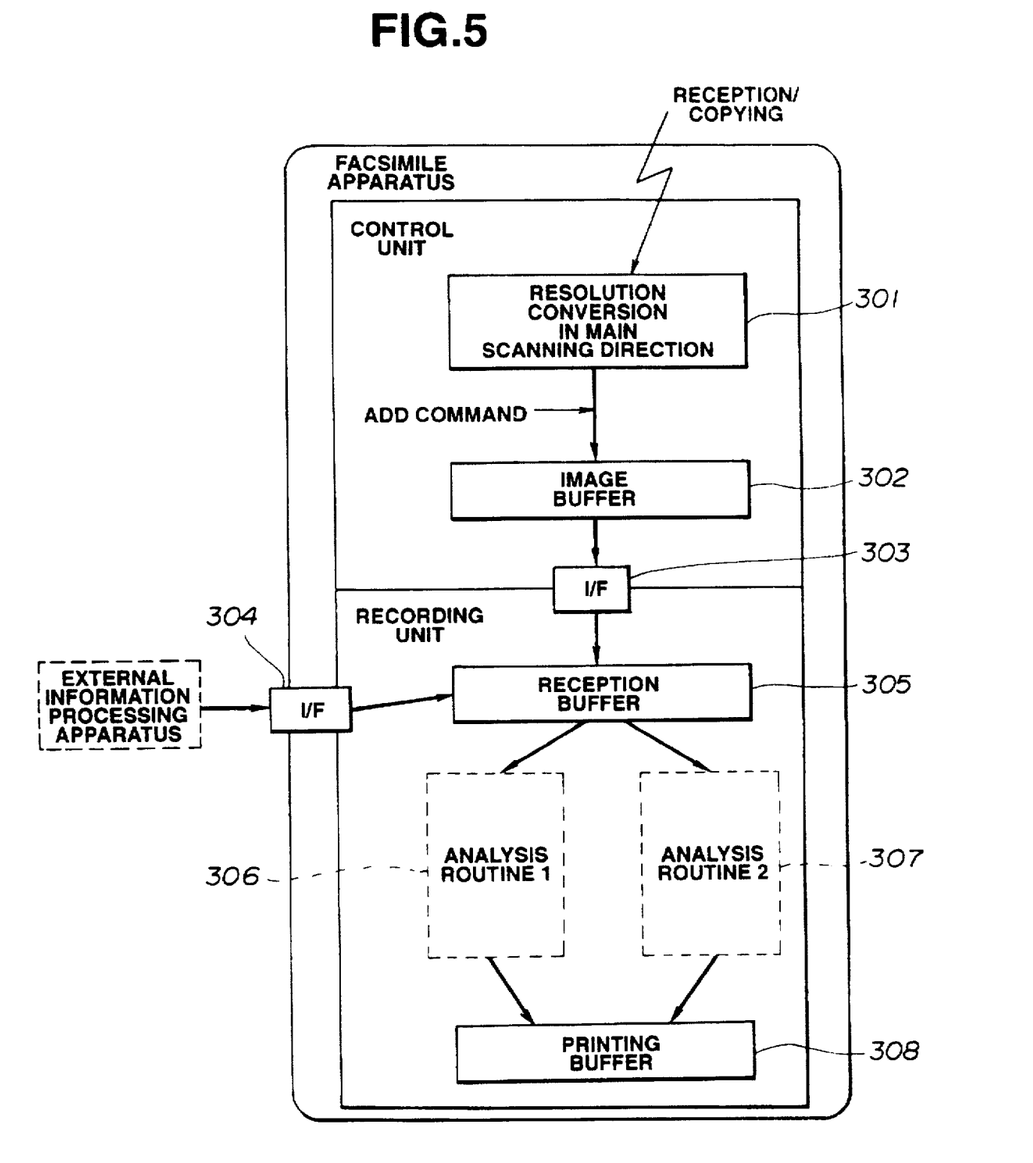
FIG. 5 is a flowchart illustrating the flow of data processing.

FIG. 6 is a block diagram illustrating the configuration of a system of data handling of the facsimile apparatus.

Image data received from the facsimile control unit 101 or obtained during a copying operation is subjected to resolution conversion 301 in the main scanning direction (the direction of lines) (after performing decoding processing and the like for received image data).

As shown in FIG. 9, when the resolution of the image data in the main scanning direction equals 8 pels, the original 9-bit data is converted into 16-bit data in order to convert the resolution into the resolution 360 dpi of the recording unit. In the present embodiment, this processing is executed by program processing of the CPU 104 within the facsimile control unit 101. For the data subjected to the resolution conversion in the main scanning direction, a control table, which controls the number of copying operations for each line of the data so as to be adjusted to the resolution of the recording unit in the sub-scanning direction in accordance with the resolution of the data in the sub-scanning direction, determines the number of copying operations for each line of the data. The obtained data relating to the number of copying operations is added to the image data as one of commands for performing various controls for the recording unit, and the resultant data is stored in an image buffer 302. As shown in FIG. 9, in resolution conversion in the sub-scanning direction, if, for example, the resolution of the image data in the sub-scanning direction equals 7.7 lines/mm, 6-bit data must be developed into 11-bit data in order to be converted into 360 dpi. The control table stores the line number and the number of copying operations of image data so as to correspond to each other in order to execute the above-described resolution conversion, and these data are stored in a predetermined region of the ROM 103. Data transfer between the facsimile control unit 101 and the recording unit 111 is performed via an interface (here, a Centronix interface) 303.

The recording unit includes a reception buffer 305 for storing data to which a control command is added (hereinafter termed "command data") transmitted from the facsimile control unit or the external information processing apparatus via the interface 303. The command data stored in the reception buffer 305 is processed by an analysis routine 1 306 or an analysis routine 2 307 if the recording unit 111 is set to the printer mode or to the facsimile mode, respectively, and only printing data to be actually printed is developed in a printing buffer 308. The analysis routines 1 and 2 are executed by program processing of the CPU 114. The printing buffer 308 can store the amount of data recorded by a single main scanning operation of the recording head 1. In the present embodiment, the printing buffer 308 has a storage capacity of 64×3648 bits. When image data for a predetermined number, of lines have been stored in the printing buffer 308, or when the printing buffer 308 has become full, a printing command is output from the CPU 1147 and actual printing is performed. After the printing has been completed, the printing data stored in the printing buffer 308 has been cleared, and new printing data is stored.

Resolution conversion in the sub-scanning direction (hereinafter briefly termed "resolution conversion") is executed when the recording unit 111 is set to the facsimile mode. In order to adjust the resolution of an image received through facsimile communication or a copied image to the resolution of the recording unit, image data for one line transmitted from the facsimile control unit 101 is developed into data for a plurality of lines in the printing buffer 308. For that purpose, the facsimile control unit 101 must add a particular control command indicating the number of lines on which the recording unit must develop the image data for one line in the printing buffer 308 (hereinafter termed a "line-copying command").

Next, a method of data handling for resolution conversion will be described in detail.

The recording unit, which has received command data, analyzes the command by the particular command routine 2 (307) used when setting the facsimile mode, and develops the data on lines, whose number has been indicated by the command, in the printing buffer 308.

Figure 6:
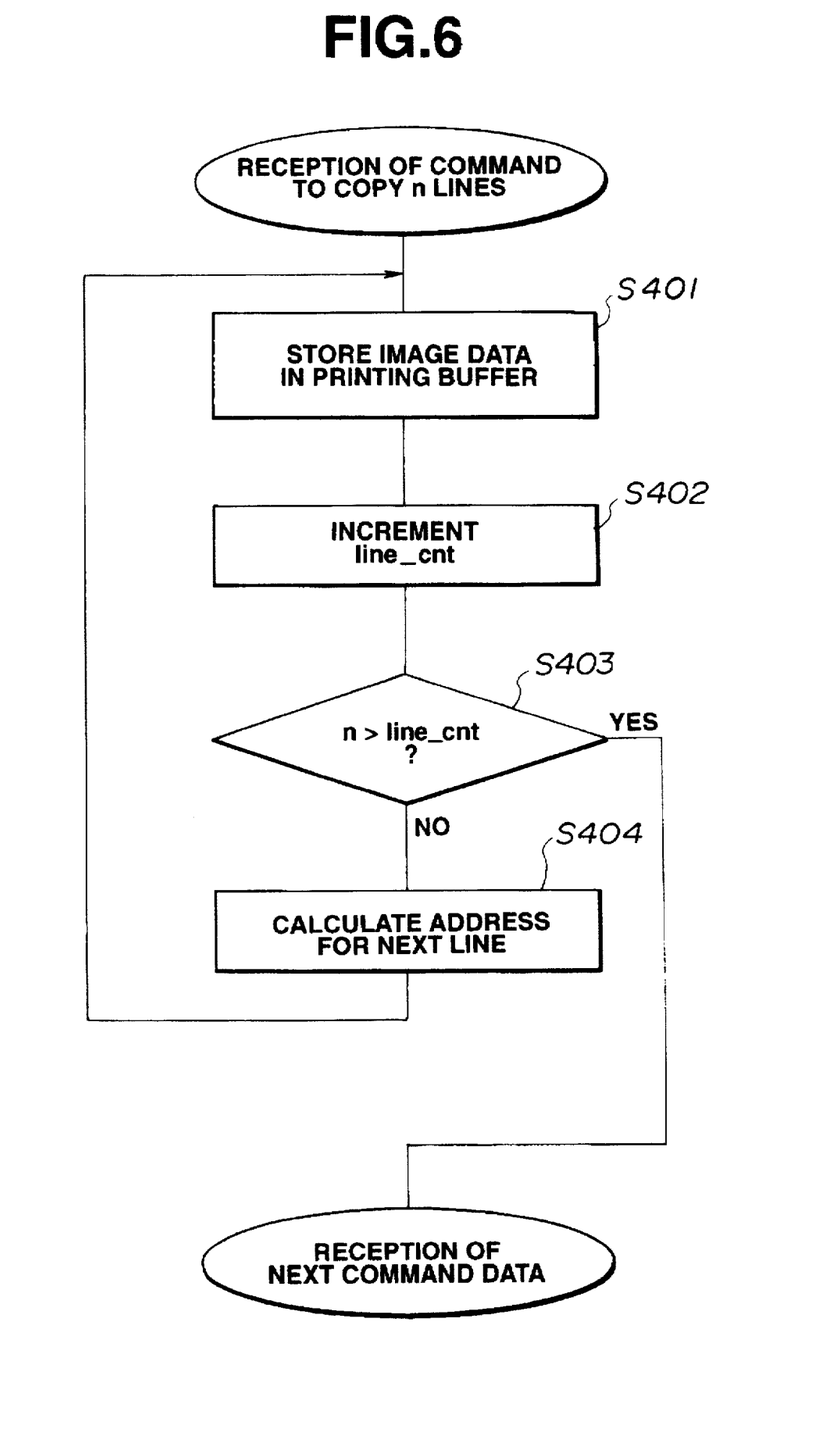
FIG. 6 is a flowchart of line-copying processing.

FIG. 6 is a flowchart illustrating line-copying processing for image data for one line. A program corresponding to this flowchart is stored in the ROM 113, and the CPU 114 performs control in accordance with this program.

When the result of the analysis of the received command indicates that "image data for one line must be copied on n lines", the data is stored in the printing buffer 308 in step S401. In step S402, a count number line__cnt, indicating the number of lines on which the image data is stored in the printing buffer 308, is incremented. In step S403, the assigned copying number of lines is compared with the number line__cnt. If the number line__cnt equals at least the assigned copying number of lines, the storage of the data is completed. If the number line__cnt is less than the assigned copying number of lines, the process proceeds to step S404, where the address in which data of the next line in the printing buffer 308 must be stored is calculated, and the process returns to step S401.

Figure 7:
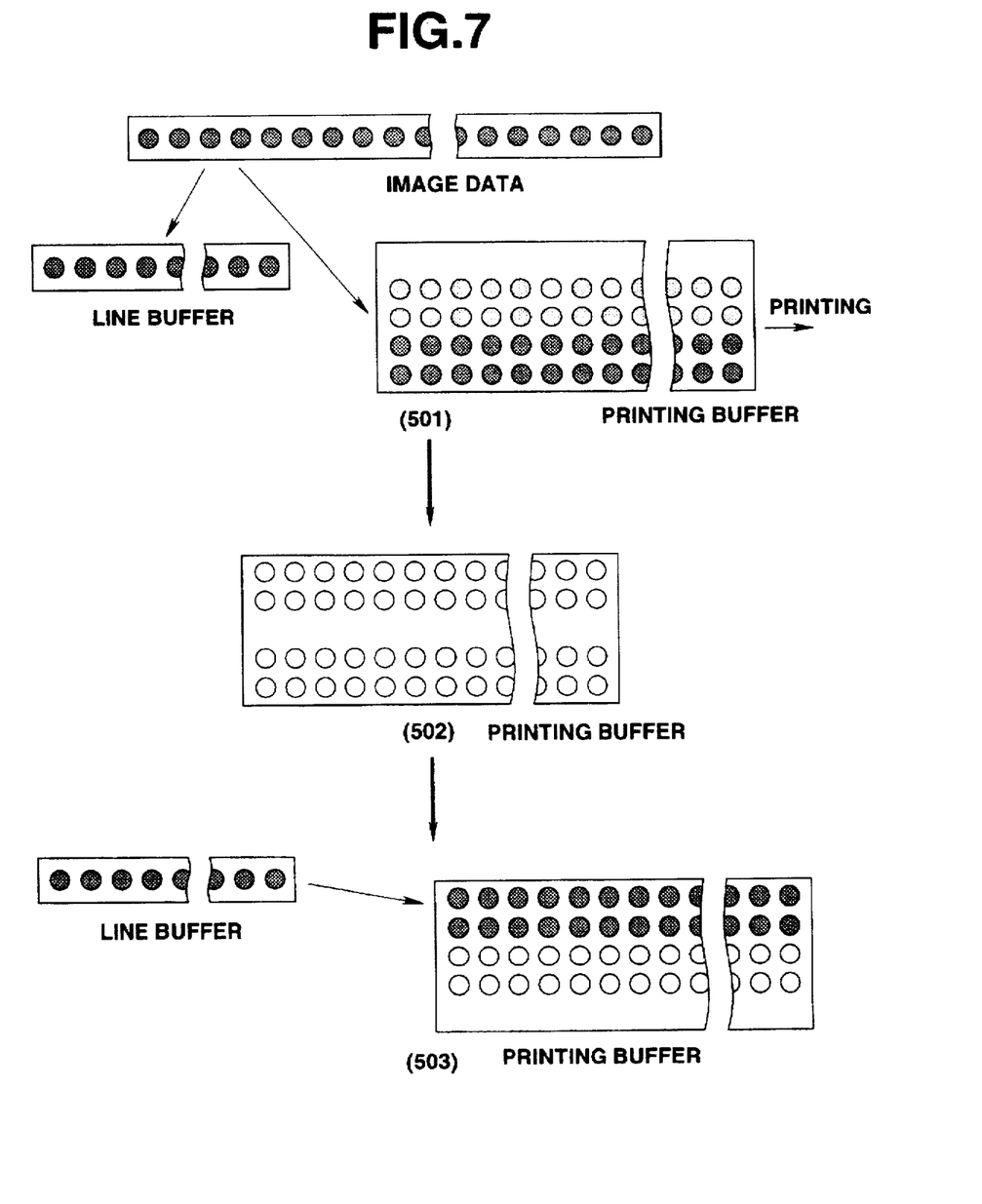
FIGS. 7 and 8 are diagrams illustrating line-copying processing when a printing buffer has overflowed.
Figure 8:
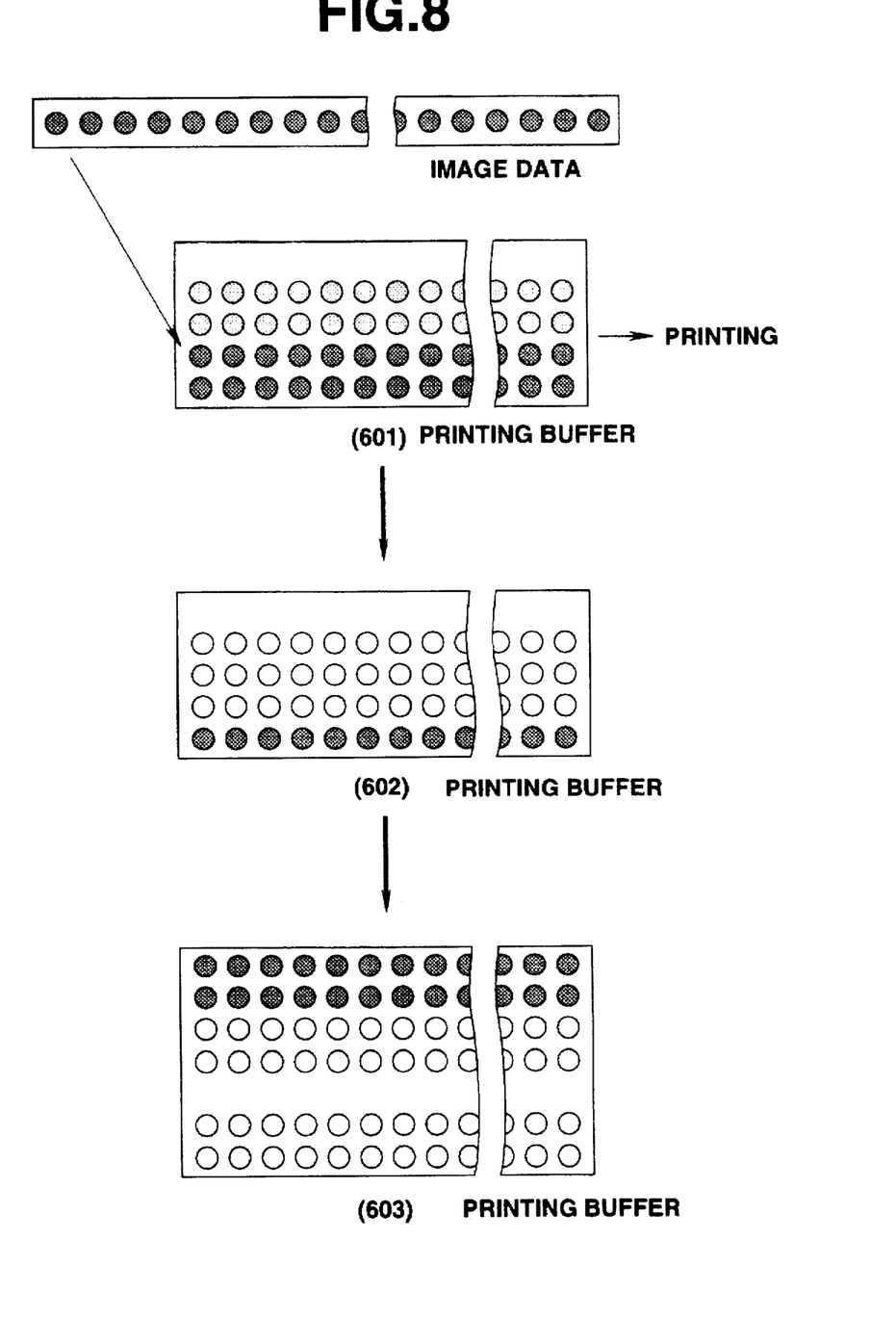

A case can be considered in which the printing buffer 308 is overflowed during line-copying processing. That is, when developing image data in the printing buffer 308 while executing line-copying processing, the capacity of the printing buffer 308 becomes, in some cases, full, so that some data cannot be copied. At that time, the line-copying processing must be temporarily interrupted. Accordingly, when the printing buffer 308 is overflowed, processing shown in FIGS. 7 and 8 is performed. For example, suppose a case in which a line-copying command instructing to develop image data for one line shown in FIGS. 7 and 8 on four lines has been received.

FIG. 7 illustrates a case in which the recording unit 111 includes a region for storing data in addition to the printing buffer 308, i.e., a line buffer for one line. Upon reception of image data, the data is also stored in the line buffer as well as in the printing buffer 808. When the printing buffer 308 has become full while executing line-copying processing, the processing is temporarily interrupted. At that time, image data for two lines has been subjected to line-copying processing (501). The data in the printing buffer 308 is printed, and the contents of the printing buffer 308 are cleared (502). Thereafter, the line-copying processing is resumed. In order to complete a copying operation of remaining two lines, data is read from the line buffer and is developed in the printing buffer 308 (503). Upon completion of the copying operation of the two lines, new data is stored in the line buffer, line-copying processing is performed, and the data is developed in the printing buffer 308.

FIG. 8 illustrates a case in which the recording unit 111 does not have a line buffer as shown in FIG. 7.

As in the case of FIG. 7, when the printing buffer 308 has become full during line-copying processing, the line-copying processing is temporarily interrupted (601). The problem in this case is that once the printing buffer 308 is cleared, the data cannot be reproduced, because means for temporarily storing the data is absent. Accordingly, as shown in FIG. 8, when printing the contents of the printing buffer 308 or moving to another processing for performing the printing (602), data stored at the lowest row is copied to the leading two rows of the printing buffer 308 with the timing when the lowest rows of the printing buffer 308 are cleared (603). Thus, incomplete line-copying processing is prevented.

As described above, according to the present embodiment, in the facsimile apparatus which can also be used as the printer of the external information processing apparatus, resolution conversion is performed by executing line-copying processing by the recording unit 111. Hence, the amount of data transfer from the facsimile control unit 101 to the recording unit 111 can be reduced, thereby causing a decrease in the data transfer time. As a result, the recording time can be reduced.

In the present embodiment, a description has been provided illustrating a particular ink-jet recorder in which recording is performed by forming flying droplets utilizing thermal energy. It is preferable to use the typical configuration and the basic principle disclosed, for example, in U.S. Pat. Nos. 4,723,129 and 4,740,796 for such a printer. The disclosed principle can be applied to any of so-called on-demand type and continuity type, but is more effectively applied to the on-demand type, because in this type, by applying at least one driving signal for providing an electrothermal transducer, disposed facing a sheet or a liquid channel where a liquid (ink) is held, with abrupt temperature rise to cause film boiling in accordance with recording information, thermal energy is generated in the electrothermal transducer, thereby causing film boiling in a heat-acting surface of a recoding head to form a bubble in the liquid (ink) in one-to-one correspondence to the driving signal. The liquid (ink) is discharged from a discharging aperture by the growth and contraction of the bubble to form at least one droplet. It is preferable to provide the driving signal in the form of a pulse, because a bubble can be instantaneously and appropriately grown and contracted, and the liquid can be discharged at a high response speed.

Driving signals described in U.S. Pat. Nos. 4,463,359 and 4,345,262 are suitable for the pulse-shaped driving signal. Better recording can be performed if conditions relating to the rate of temperature rise of the above-described heat-acting surface described in U.S. Pat. No. 4,313,124 are adopted.

As for the configuration of the recording head, in addition to configurations obtained by combining a discharging port, a liquid channel and electrothermal transducers (a linear liquid channel or an orthogonal liquid channel) disclosed in the above-described patent specifications, configurations, in which a heat-acting surface is disposed at a curved region, disclosed in U.S. Pat. Nos. 4,558,333 and 4,459,600, may also be adopted.

Furthermore, a configuration, in which a common slit is used as a discharging unit of a plurality of electrothermal transducers, disclosed in Japanese Patent Laid-Open Application (Kokai) No. 59-123670 (1984), or a configuration, in which an aperture for absorbing the pressure wave of thermal energy is provided so as to correspond to a discharging unit, disclosed in Japanese Patent Laid-Open Application (Kokai) No. 59-138461 (1984), may also be adopted.

For a full-line-type recording head having a length corresponding to the width of the longest recording medium which can be recorded by the recorder, any of a configuration, in which the length is covered by combining a plurality of recording heads as described in the foregoing patent specifications, and a configuration, in which the length is covered by an single integrated recording head, may be adopted.

The present invention is also effective even if an exchangeable chip-type recording head, in which electrical connection with the main body of the apparatus and ink supply from the main body of the apparatus can be performed by being mounted in the main body of the apparatus, or a cartridge-type recording head, in which an ink tank is provided as one body with the recording head, is used.

It is preferable to add recovery means, preliminary auxiliary means and the like for the recording head, because the effects of the present invention are further stabilized. More specifically, the provision of capping means, cleaning means, and pressing or attraction means for the recording head, and preliminary heating means comprising electrothermal transducers, another heating elements, or combination of these units, and the provision of a preliminary discharging mode for performing a discharging operation different from a discharging operation for recording are effective for performing stable recording.

The apparatus may use not only a recording mode of a single main color, such as black or the like, but also at least one of a recording mode of a plurality of different colors, and a full-color recording mode obtained by color mixing, by using a single integrated recording head or combination of a plurality of recording heads.

In the above-described embodiments, a description has been provided assuming that the ink is liquid. However, the ink may solidify at a temperature equal to or lower than the room temperature, and may soften or be liquidified at the room temperature. Particularly in the above-described ink-jet method, the temperature of the ink is generally adjusted within a range between 30° C. and 70° C. so as to maintain the viscosity of the ink within a stable discharging range. Accordingly, it is only necessary that the ink is liquid when a recording signal is provided.

Furthermore, in order to prevent temperature rise due to thermal energy by positively using the thermal energy as energy for a change from a solid state to a liquid state, or to prevent evaporation of ink, ink, which solidifies in an unused state, and which is liquidified by thermal energy provided by a recording signal and is discharged in the form of a liquid droplet, and solidifies when the droplet reaches a recording medium, may be used. As described in Japanese Patent Laid-Open Applications (Kokai) Nos. 54-56847 (1979) and 60-71260 (1985), such ink may be held in recesses or threaded holes of a porous sheet in a liquid state or a solid state so as to face electrothermal transducers. In the present invention, the above-described film boiling method is most effective for the above-described ink.

The recorder of the present invention may comprise not only the above-described facsimile apparatus, but also an image output terminal integrated with or separated from an information processing apparatus, such as a word processor, a computer or the like, or a copier combined with a reader or the like.

As described above, according to the present invention, by adding information for resolution conversion to image data and transmitting the resultant data from data transmission means, resolution conversion of the image data is performed at the side of data processing means while performing copying processing. Hence, the data transfer time can be shortened compared with a case in which resolution conversion of image data is performed at the side of the data transmission means, and data is repeatedly transmitted to the data processing means.

By applying such processing to a recorder, the recording time can be shortened.

The individual components shown in outline or designated by blocks in the drawings are all well known in the data processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus, comprising:
   data transmission means for transmitting line image data while adding information for converting a resolution in a direction different from a line direction from a first resolution into a second resolution, which is higher than the first resolution, to the image data; and data processing means for converting the resolution, in a direction different from the line direction, of the line image data into the second resolution by receiving the image data and the information transmitted from said data transmission means, and performing copying of the image data based on the information, and for performing predetermined processing in accordance with converted data.

2. An apparatus according to claim 1, wherein said data transmission means transmits the line image data and the information to said data processing means after performing resolution conversion of the image data in the line direction.

3. An apparatus according to claim 1, wherein said data transmission means receives image data transmitted through a network, and transmits line image data which corresponds to the received image data to said data processing means.

4. A data processing apparatus, comprising:

data transmission means for transmitting line image data while adding information for converting a resolution in a direction different from a line direction from a first resolution into a second resolution, which is higher than the first resolution, to the image data;

data processing means for converting the resolution, in a direction different from the line direction, of the line image data into the second resolution by receiving the image data and the information transmitted from said data transmission means, and performing copying of the image data based on the information; and recording means for performing recording on a recording material with the second resolution based on the image data subjected to the resolution conversion by said data processing means.

5. An apparatus according to claim 4, wherein said data transmission means transmits the line image data and the information to said data processing means after performing resolution conversion of the image data in the line direction.

6. An apparatus according to claim 4, wherein said data transmission means receives image data transmitted through a network, and transmits line image data which corresponds to the received image data to said data processing means.

7. An apparatus according to claim 4, wherein said data transmission means comprises reading means for reading an image, and wherein image data read by said reading means is transmitted to said data processing means.

8. An apparatus according to claim 6 or 7, further comprising:

input means for inputting image data output from an external information processing apparatus to said data processing means; and switching means for switching input to said data processing means between said data transmission means and said input means.

9. An apparatus according to claim 4, wherein said recording means performs main scanning by relatively moving a recording head, in which a plurality of recording elements are arranged, with respect to a recording material in a main scanning direction, and the recording material is relatively moved with respect to the recording head in a sub-scanning direction after the main scanning has been completed.

10. An apparatus according to claim 9, wherein the plurality of recording elements are arranged in the sub-scanning direction with an interval corresponding to the second resolution.

11. An apparatus according to any of claims 9 and 10, wherein the recording head discharges an ink droplet by producing a change in the state of the ink using discharging energy generated by the recording element.

12. A data processing method, comprising the steps of:

obtaining line image data;

transmitting the obtained image data while adding information for converting a resolution in a direction different from a line direction from a first resolution into a second resolution, which is higher than the first resolution, to the image data;

receiving the transmitted information and line image data;

converting the resolution of the image data into the second resolution by performing copying of the line image data based on the received information; and performing predetermined processing in accordance with the image data subjected to the resolution conversion.

13. A method according to claim 12, wherein said transmitting step transmits the image data with the information after converting the resolution of the line image data in the line direction into the second resolution.

14. A method according to claim 12, wherein said obtaining step obtains the line image data having the first resolution by receiving image data transmitted through a network.

15. A data processing method, comprising the steps of:

obtaining image data;

transmitting the obtained image data while adding information for converting a resolution in a direction different from a line direction from a first resolution into a second resolution, which is higher than the first resolution, to the image data;

receiving the transmitted information and line image data;

converting the resolution of the line image data into the second resolution by performing copying of the image data based on the received information; and recording an image on a recording material in accordance with the image data subjected to the resolution conversion.

16. A method according to claim 15, wherein said transmitting step transmits the image data with the information after converting the resolution of the line image data in the line direction into the second resolution.

17. A method according to claim 15, wherein said obtaining step obtains the line image data having the first resolution by receiving image data transmitted through a network.

18. A method according to claim 15, wherein in said recording step, an image is recorded on a recording material by performing main scanning by relatively moving a recording head, in which a plurality of recording elements are arranged, respect to a recording material in a main scanning direction, which is different from the direction of arrangement of the plurality of recording elements, and by performing sub-scanning by relatively moving the recording material with respect to the recording head in a direction different from the main scanning direction after the main scanning has been completed.

19. A method according to claim 18, wherein the recording head comprises the plurality of recording elements arranged with an interval corresponding to the second resolution.

20. A method according to claim 18 or 19, wherein the recording head discharges an ink droplet by producing a change in the state of the ink using discharging energy generated by the recording element.

21. A method according to claim 20, wherein the recording head discharges an ink droplet by generating a bubble in ink using thermal energy generated by the recording element.

* * * * *

UNITED STATES PATENT AND TRADEMARK OFFICE
CERTIFICATE OF CORRECTION

PATENT NO. : 5,732,196

DATED : March 24, 1998

INVENTOR(S) : Naoya Watanabe

It is certified that error appears in the above-identified patent and that said Letters Patent is hereby corrected as shown below:

On the title page item,

[56] REFERENCES CITED

Foreign Patent Documents, "5458647" should read --54-58647--.

COLUMN 3

Line 33, "flowchart" should read --block diagram--.

COLUMN 4

Line 53, "spurs" should read --the spurs--.

COLUMN 5

Line 33, "control," should read --control--.

COLUMN 6

Line 42, "FIG. 6" should read --FIG. 5--.

UNITED STATES PATENT AND TRADEMARK OFFICE
CERTIFICATE OF CORRECTION

PATENT NO. : 5,732,196

DATED : March 24, 1998

INVENTOR(S) : Naoya Watanabe

Page 2 of 3

It is certified that error appears in the above-identified patent and that said Letters Patent is hereby corrected as shown below:

Line 53, "resolution 360 dpi" should read --360 dpi resolution--; and     Line 65, "commands" should read --the commands--.

COLUMN 7

Line 27, "number," should read --number--; and

Line 51, "on" should read --in--.

COLUMN 8

Line 14, "to develop" should read --the development of--; and     Line 28, "of" should read --of the--.

UNITED STATES PATENT AND TRADEMARK OFFICE
CERTIFICATE OF CORRECTION

PATENT NO. : 5,732,196

DATED : March 24, 1998

INVENTOR(S) : Naoya Watanabe

It is certified that error appears in the above-identified patent and that said Letters Patent is hereby corrected as shown below:

COLUMN 9

Line 60, "another" should read --other-- and "or" should read --or a---.

COLUMN 10

Line 16, "ink, ink," should read --ink,--.

Signed and Sealed this

Fourteenth Day of September, 1999

Attest:

Q. TODD DICKINSON

*Attesting Officer*　　*Acting Commissioner of Patents and Trademarks*